United States Patent
Yoo et al.

(10) Patent No.: US 8,521,924 B2
(45) Date of Patent: Aug. 27, 2013

(54) METHOD OF CONTEXT AWARE DATA-CENTRIC STORAGE FOR WIRELESS SENSOR NETWORKS

(75) Inventors: Jae-Soo Yoo, Chungju Chungbuk (KR); Jun-Ho Park, Chungju Chungbuk (KR); Dong-ook Seong, Chungju Chungbuk (KR); Hyun-Ju Kim, Chungju Chungbuk (KR)

(73) Assignee: Chungbuk National University Industry Academic Cooperation Foundation, Chungbuk (KR)

( * ) Notice: Subject to any disclaimer, the term of this patent is extended or adjusted under 35 U.S.C. 154(b) by 99 days.

(21) Appl. No.: 13/338,759

(22) Filed: Dec. 28, 2011

(65) Prior Publication Data

US 2013/0159357 A1     Jun. 20, 2013

(30) Foreign Application Priority Data

Dec. 14, 2011 (KR) ........................ 10-2011-0134362

(51) Int. Cl.
*G06F 13/00* (2006.01)
*G06F 3/00* (2006.01)

(52) U.S. Cl.
USPC ............. 710/58; 710/2; 710/5; 710/8; 710/15

(58) Field of Classification Search
None
See application file for complete search history.

(56) References Cited

U.S. PATENT DOCUMENTS

2011/0299470 A1* 12/2011 Muller et al. ................. 370/328
2013/0016625 A1* 1/2013 Murias et al. ................. 370/254

OTHER PUBLICATIONS

Hyunju, Kim et al., A context aware data-centric storage scheme in wireless sensor network, *Korea Computer Congress (KCC)*, vol. 38, No. 1(A), pp. 381-384 (Jun. 30, 2011)—No English translation attached.

* cited by examiner

*Primary Examiner* — Scott Sun
(74) *Attorney, Agent, or Firm* — Harness, Dickey & Pierce, P.L.C.; J. Timothy Keane; Kisuk Lee

(57) ABSTRACT

There is provided a method of context aware data-centric storage for dynamically changing a data storage range comprising: collecting data from entire sensor nodes, after establishing a data storage range of an entire sensor network, dividing areas, and transmitting a message of data storage range information to the entire sensor nodes by a base station; storing the collected data in a storage sensor node by determining whether there is a node responsible for storing the collected data to carry out operation depending on the determination result; determining whether the data storage has not been carried out for a period of time longer than a specified time in each sensor node after storing the data; and to determining whether the scale of invalid range is not smaller than $\Gamma$.

7 Claims, 9 Drawing Sheets

| Time | Min | Max |
|---|---|---|
| $t_1$ | -20 °C | 40 °C |
| $t_2$ | 10 °C | 40 °C |

FIG.8

METHOD OF CONTEXT AWARE DATA-CENTRIC STORAGE FOR WIRELESS SENSOR NETWORKS

CROSS-REFERENCE TO RELATED APPLICATIONS

This application claims the benefit and priority to Korean Patent Application No. 10-2011-0134362, filed Dec. 14, 2011. The entire disclosure of the application identified in this paragraph is incorporated herein by reference.

FIELD

The present disclosure relates to a method of data-centric storage. Particularly, this disclosure relates to a method of context aware data-centric storage for wireless sensor networks comprising dynamically changing data storage ranges for distributing and storing data occurring in an entire sensor database.

BACKGROUND

This section provides background information related to the present disclosure which is not necessarily prior art.

Recently, methods have been proposed for storing and processing collected data energy-efficiently in the field of sensor networks. For the collected data in the field of sensor networks, exemplary methods include the hash function based on data values, and the method of Data-Centric Storage (DCS) for classifying the collected data by means of local positions to store the collected data in specific sensor nodes.

The method of data-centric storage specifies an entire range of data to be stored to project the range on a space where the sensor nodes are deployed, and divides the entire range depending on the geographical position of each node to allocate the divided storage ranges to each node.

The method of data-centric storage does not distribute queries to an entire network to request data for query processing, but distributes the queries only to the nodes for storing data relevant to a query range to request data. The method of data-centric storage thus implements effective query processing. Therefore, the method of data-centric storage is appropriate from the view point of a sensor network which operates on the basis of limited energy.

The methods of data-centric storage in the prior art maintain a data storage range specified in initially constituting a sensor network without change.

However, a real sensor network collects and applies data in an environment in which different data ranges occur over periods. In such an application, with a fixed entire data storage range as in the methods of data-centric storage in the prior art, it is impossible to equally use the storage space of sensor nodes in an entire network. Therefore, local data and query hot spots occur in a specific sensor node, so that all of the nodes in the sensor network cannot be effectively used.

A sensor node may easily have faults, of which the operation is limited due to data and query hot-spots in a specific node, and the life span of an entire network is thereby reduced.

Channel collision and packet loss occur due to data and query hot spot in a specific node and a data response relevant to queries, the query processing speed and the accuracy of query result is reduced in the prior art method.

SUMMARY

This section provides a general summary of the disclosure and is not a comprehensive disclosure of its full scope or all of its features.

The present invention is proposed to address, in part, the afore-mentioned problems in the prior art. The present disclosure provides a method of context aware data-centric storage for wireless sensor networks by dynamically changing data storage ranges depending on data occurrence patterns in which data occurrence changes over time to distribute and stores the resultant occurring data to/in an entire sensor database.

The method of context aware data-centric storage for wireless sensor networks of the present invention comprises: collecting data from entire sensor nodes, after establishing a data storage range for an entire sensor network at a base station, dividing areas, and transmitting a message regarding data storage range information to the entire sensor nodes; storing the collected data in a storage sensor node by determining if there is a node responsible for storing the collected data to carry out an operation (depending on the determination result); determining if the data storage is carried out for a period of time longer than a specified time in each sensor node after storing the data to decide whether to return to the step of collecting data or transmit a message regarding invalid range occurrence to the base station; and determining if the scale of invalid range is smaller than $\Gamma$ to carry out an operation (depending on the determination result) to decide whether to return to the step of collecting data.

The afore-mentioned method of context aware data-centric storage for wireless sensor network of the present invention has the following advantages:

First, it is possible to distribute and store data to/in entire sensor nodes deployed in a sensor network space, in consideration of considering data occurrence patterns.

Second, it is possible to minimize data loss resulting from an insufficient storage space, even when data are quickly collected for an expanded network storage space required for use of entire sensor nodes.

Third, it is possible to distribute data to entire nodes in a wide range to reduce hot spots on which data and queries are concentrated, thereby improving the life span of a sensor network.

Fourth, it is possible to reduce channel collision and packet loss, even when many queries are generated, resulting in a fast query processing speed and improved accuracy of query results.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The drawings described herein are for illustrative purposes only of selected embodiments and not all possible implementations, and are not intended to limit the scope of the present disclosure.

FIG. 8 shows a range change history table for query processing by means of a method of context aware data-centric storage according to an embodiment of the present invention.

It should be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

DETAILED DESCRIPTION

Hereinafter, exemplary embodiments of the present invention will be described in detail with reference to the accompanying drawings.

The present invention relates to a method of context aware data-centric storage for wireless sensor networks which can address a hot spot where data depending on data occurrence patterns, in which data occurrence changes over time, are concentrated on a specific node, which enables nodes over an entire network to equally use a storage space and to improve the life span of the network.

A preferred embodiment of the method of context aware data-centric storage for wireless sensor networks of the invention will now be described with reference to the accompanying drawings.

Figure 1:
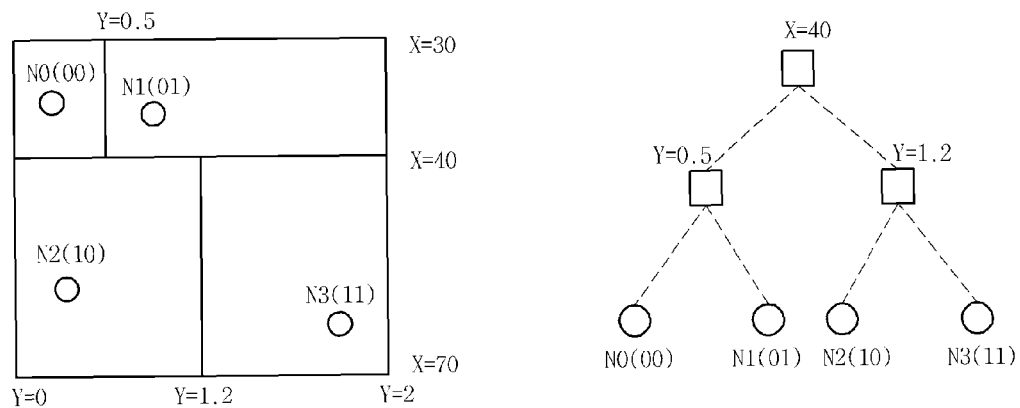
FIG. 1 shows a schematic concept of a method of data-centric storage according to an embodiment of the present invention.

FIG. 1 shows a method of data-centric storage according to an embodiment of the present invention.

Sensor networks are data storage methods for effectively storing and processing sensed data thereon in order to improve query processing performance.

As shown in FIG. 1, a method of data-centric storage of the present invention is a type of storing data collected by sensor nodes in specific sensor nodes (for example, 4 nodes of N0(00), N1(01), N2(10) and N3(11)) depending on data values. Since the data are stored in the sensor network, it is possible to reduce the cost of data storage, and the method ensures energy efficient management because queries are directly distributed only to sensor nodes which stores data in query processing.

Figure 2:
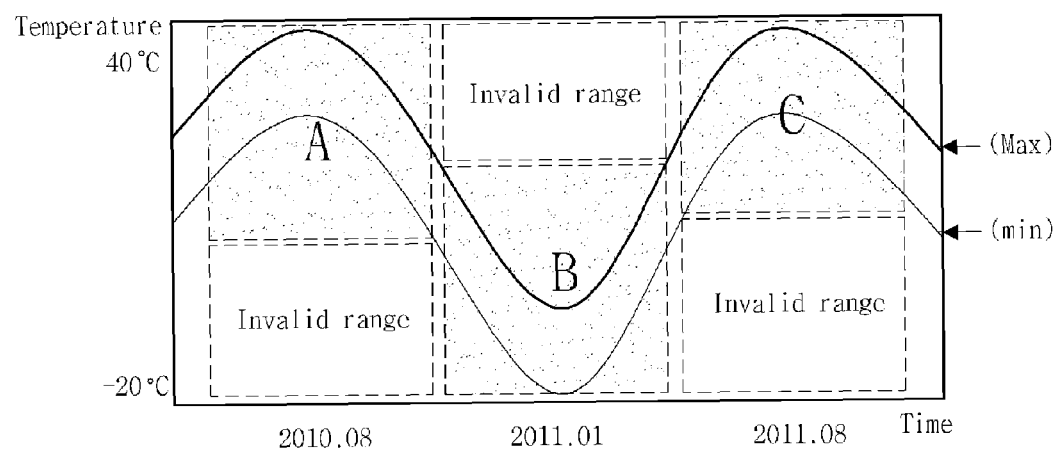
FIG. 2 is a graph illustrating characteristics of collected data in a sensor network according to an embodiment of the present invention.

FIG. 2 illustrates an example for describing characteristics of collected data in a distribution environment of a sensor network, which will now be described.

The sensor network shown in FIG. 2 is used in measuring natural phenomena which shows the type of occurrence patterns changing over periods (seasons), e.g., atmospheric temperatures, sea water temperature distributions, precipitations, etc.

For example, a sensor network constructed to store data in the temperature range of −20 to 40° C. has data generated in the range of A, B and C every cycle as shown in FIG. 2. Therefore, data storage is concentrated on nodes which store the relevant data range, and data storage is not carried out in nodes responsible for storing data in the range other than the afore-mentioned range.

The range in which data storage does not occur will hereinafter be referred to as an invalid range in embodiments of the present invention. In general, the greater the invalid range is, the higher storage inequality of a network is, and the more the storage space of nodes is wasted. Therefore, it is necessary to minimize the invalid range to improve storage space efficiency of a sensor network.

If data are stored on the basis of a fixed data storage range initially specified in a network, there occurs unequal use of a storage space by sensor nodes in the entire network, resulting in reduction of the life span of the network due to data hot spots localized in specific node(s). If a query is given for collecting data after storing collected data, there may occur additional reduction of the life span of the network due to query hot spots.

In an embodiment of the present invention, where data occurrence patterns change, a relevant situation is recognized to address unequal storage of sensor nodes by changing the fixed data storage range of a sensor network. With such a method, it is possible to distribute data and queries concentrated on a specific node to the entire sensor network.

Figure 3:
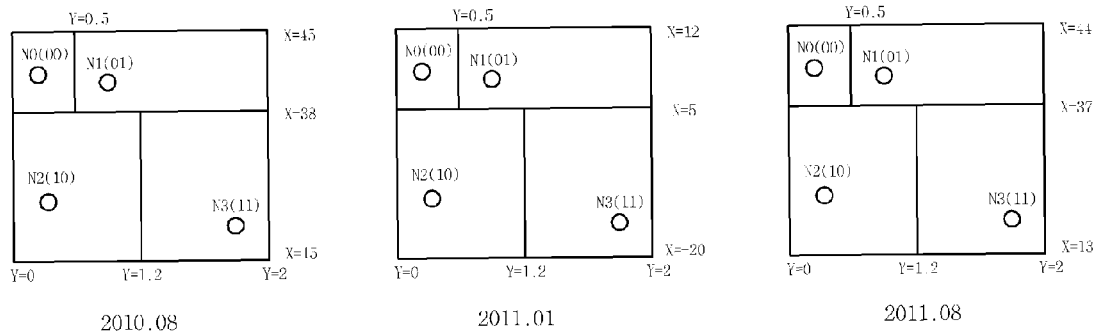
FIG. 3 illustrates a method of context aware data-centric storage according to an embodiment of the present invention.

FIG. 3 shows an example of changing a data storage range depending on data occurrence patterns in the method of context aware data-centric storage for wireless sensor networks according to the present invention, in which data are distributed to the entire network, unlike the prior art methods of data-centric storage.

A method of the present invention limits minimum and maximum ranges of data occurrence to determine data collection nodes on the basis of a relevant range, and to distribute and store data and queries concentrated on and stored in a specific node to/in a plurality of nodes. For example, 4 nodes in FIG. 3 in the entire network can avoid energy waste caused by concentration on a specific node.

In the present invention, it is necessary to recognize occurrence of exceptional data in order to change the data storage range in driving the method of context aware data-centric storage for wireless sensor networks, and to establish a new storage range.

Figure 4:
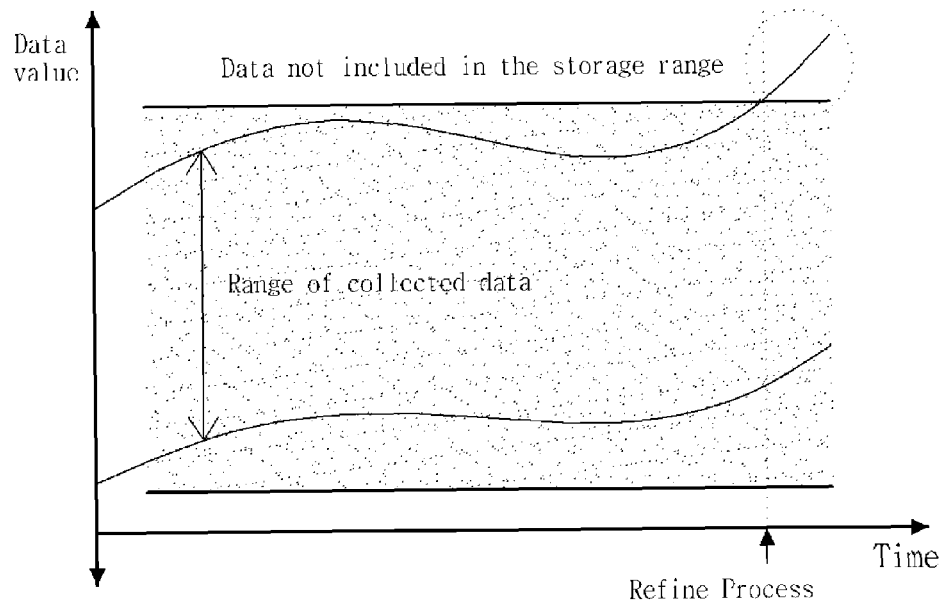
FIG. 4 is a graph showing exceptional data occurrence according to an embodiment of the present invention.
Figure 5:
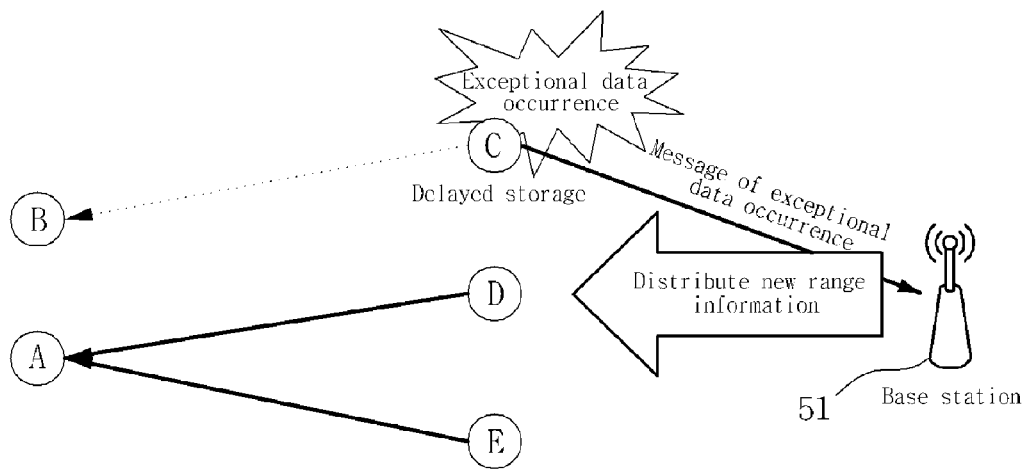
FIG. 5 shows a concept illustrating a method of delayed-storage of data depending on exceptional data occurrence according to an embodiment of the present invention.

FIGS. 4 and 5 illustrate exceptional data collection, establishing a new storage range and storage of collected data.

First, FIG. 4 illustrates occurrence of exceptional data for changing the data storage range.

The occurrence of exceptional data implies data collection in a new range not included in the data storage range. For example, where a sensor node collects exceptional data, there is no sensor for storing the exceptional data in the sensor network. Therefore, it is required to change the entire storage range to include the value of exceptional data.

FIG. 5 illustrates the method of delayed-storage of exceptional data depending on the occurrence of exceptional data. If the exceptional data occurs, delayed-storage is required to be carried out to store the exceptional data because there is no sensor node responsible for storing the exceptional data.

In this case, since each sensor node knows the current entire storage range, the sensor node itself, which collected the exceptional data, determines storage of the exceptional data.

For example, if the node 'C' collected exceptional data in FIG. 5, the node 'C' stores the relevant exceptional data in a temporary storage and notifies a base station 51 of the exceptional data information by means of a message regarding exceptional data occurrence. Base station 51, which received the message regarding exceptional data occurrence, updates the entire storage range on the basis of the information on the exceptional data occurrence, and distributes the updated storage range to entire sensor nodes. The node 'C', which receives the updated entire storage range, determines a storage location of the exceptional data stored in the storage thereof to carry out a storage process.

As such, a method of the present invention recognizes invalid range occurrence and establishes a new storage range in order to change a data storage range.

Figure 6:
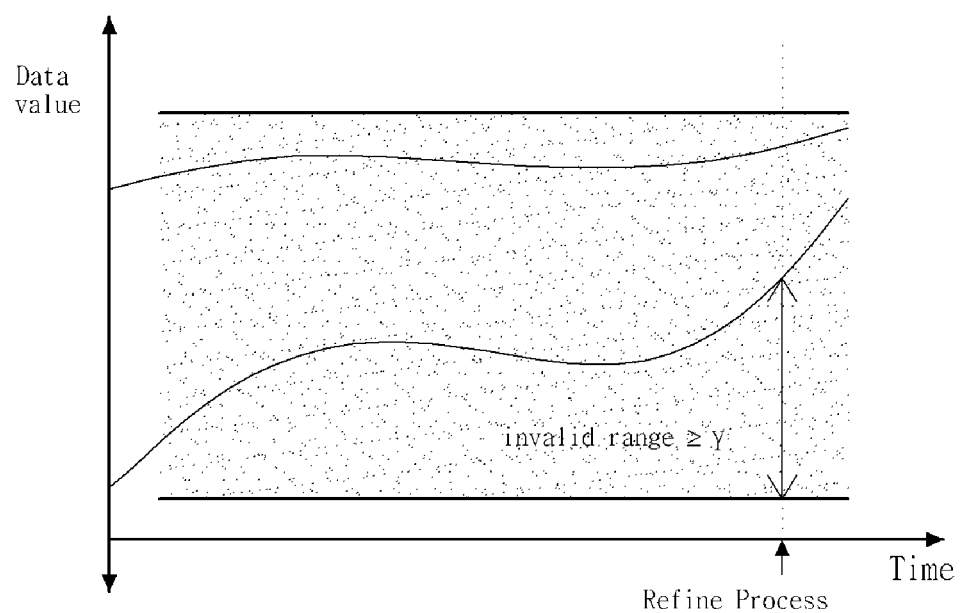
FIG. 6 is a graph showing invalid range occurrence depending on an embodiment of the present invention.

FIG. 6 illustrates invalid range occurrence according to an embodiment of the present invention.

With reference to FIG. 6, invalid range occurrence and establishment of a new storage range will now be described.

First, invalid range occurrence implies that there is a range in which data has not been stored for a given period of time. If the invalid range increases, data occurrence is concentrated on values in a certain range. Therefore, the entire storage range is changed if a range in which data storage does not occur for a period of time longer than a threshold γ occurs in order to minimize the invalid range.

A method of changing an entire storage range will now be described where a range in which data storage does not occur for a period of time longer than a threshold occurs.

Figure 7:
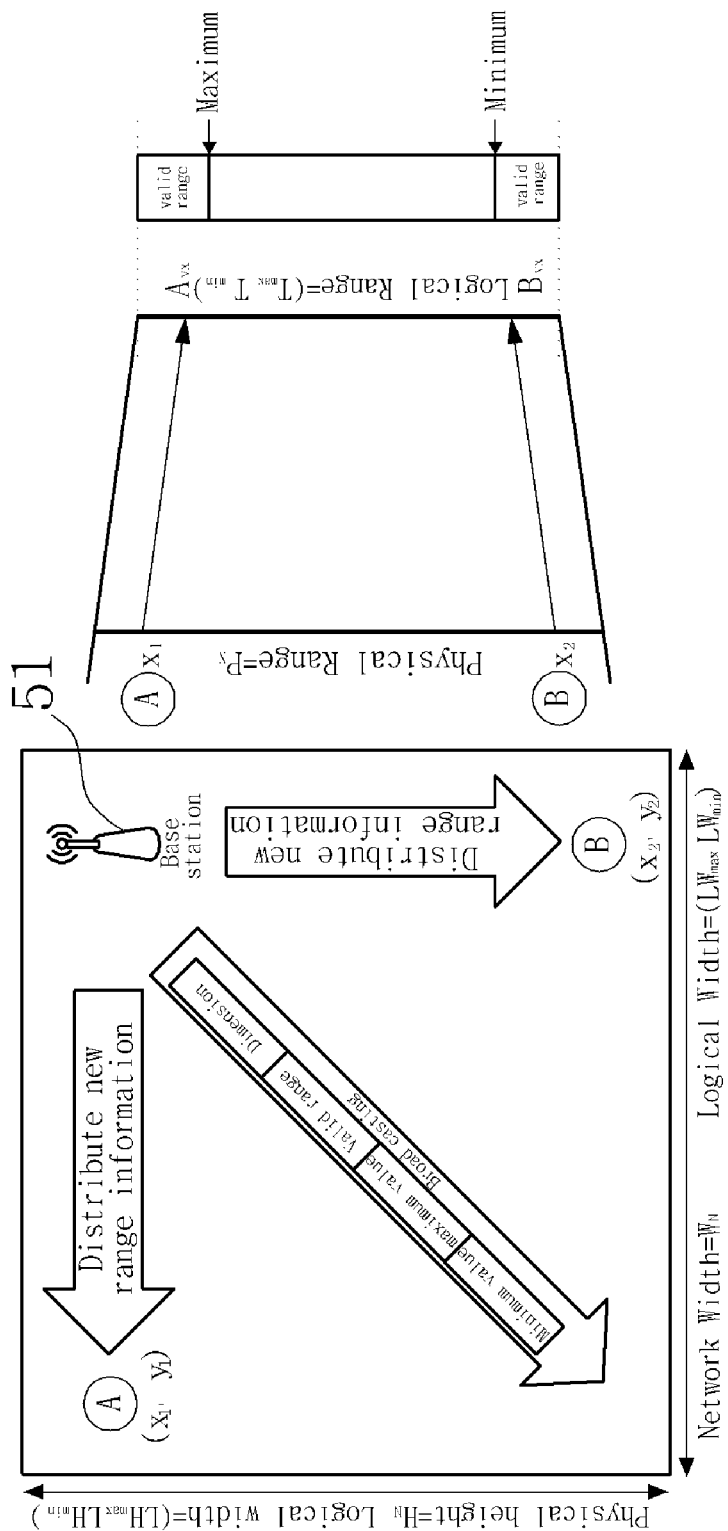
FIG. 7 shows a configuration illustrating a method of distributing a new storage range by means of the method of context aware data-centric storage according to an embodiment of the present invention.

FIG. 7 shows a method of distributing a new storage range of the method of context aware data-centric storage according to an embodiment of the present invention.

As shown in FIG. 7, the network range information distributed to change the entire storage range includes a minimum value (min), a maximum value (max), a valid range (α: damper) of the network, and dimension information (s) for the changed network range.

In this case, the minimum value (min) and the maximum value (max) include an exceptional data range and represent an entire storage range in which the invalid range is eliminated.

Figure 8:
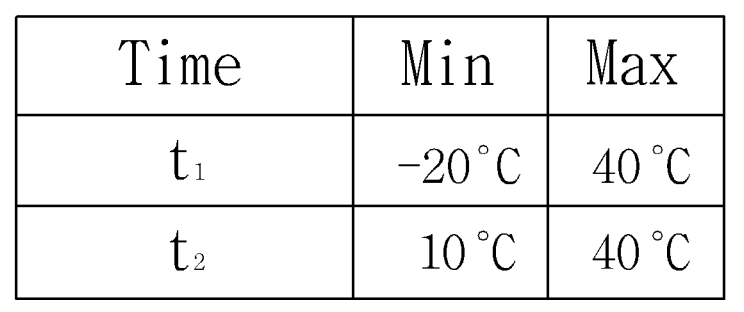

The valid range (a) is a range added to the entire storage range determined to avoid frequent network change. In FIG. 8, if changing the storage range is required with respect to the temperature dimension, base station 51 calculates the storage range for temperatures with data occurrence patterns, and distributes a message including the calculated storage range with respect to the temperature dimension (minimum value ($T_{min}$), maximum value ($T_{max}$), effective range (α), dimension (s)) to the entire sensor nodes.

Each sensor which received the message then changes the storage range thereof. When each sensor changes the storage range thereof, the entire sensor network, the entire sensor network has physically the scale of $H_N$ (Physical Height), but the size of the logical sensor network is $<T_{min}+α, T_{max}+α>$ which is a changed temperature storage range.

A method of query processing depending on dynamic data change(s) will now be described with reference to FIG. 8.

FIG. 8 shows a range change history table for query processing of a method of context aware data-centric storage according to an embodiment of the present invention.

In the embodiment of the present invention, the entire storage range is different in each time zone depending on the occurrence of exceptional data or an invalid range. Therefore, the storage range information in each time zone is required when the entire storage range is changed in the temporal range required in a relevant query in order to process the query. The proposed method holds the data storage range information for each temporal range in sensor nodes. The entire storage range information for each time zone is held in the type of range change history as shown in FIG. 8, and the range change history consists of a pair of temporal information when the entire storage range is changed and the entire storage range information for the relevant time zone. Through the process, where a query is given to a specific sensor node, each sensor node divides and processes the temporal range required by the query, using the range change history.

Figure 9:
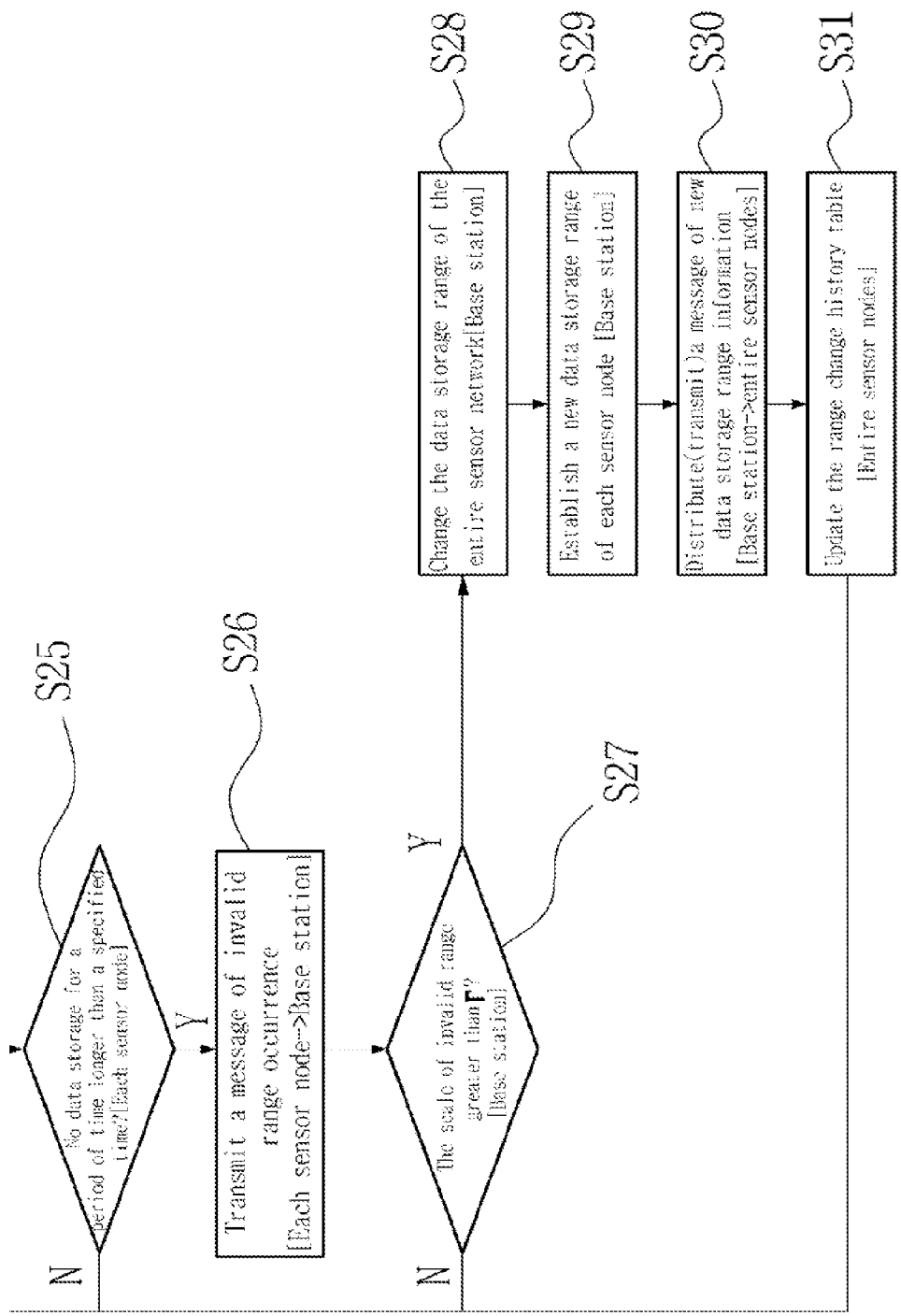
FIG. 9 is a flow chart of operation of a method of context aware data-centric storage for wireless sensor networks according to an embodiment of the present invention.
Figure 9:
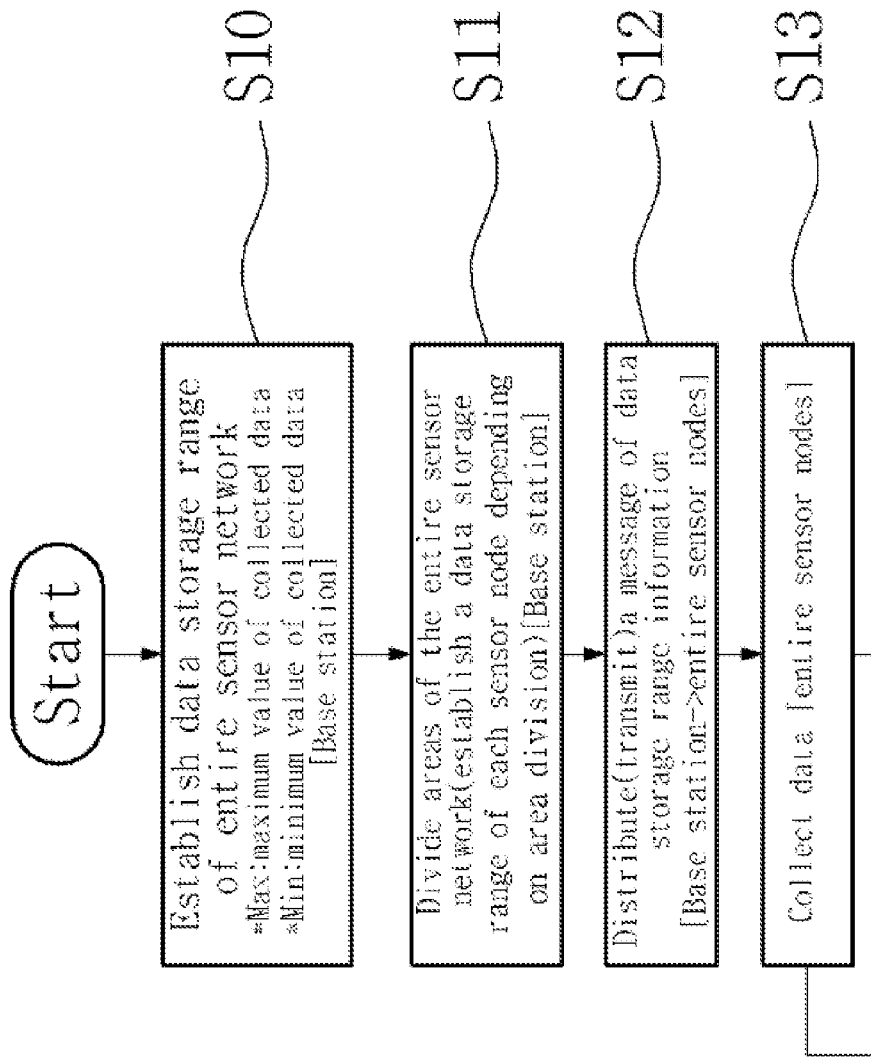
Figure 9:
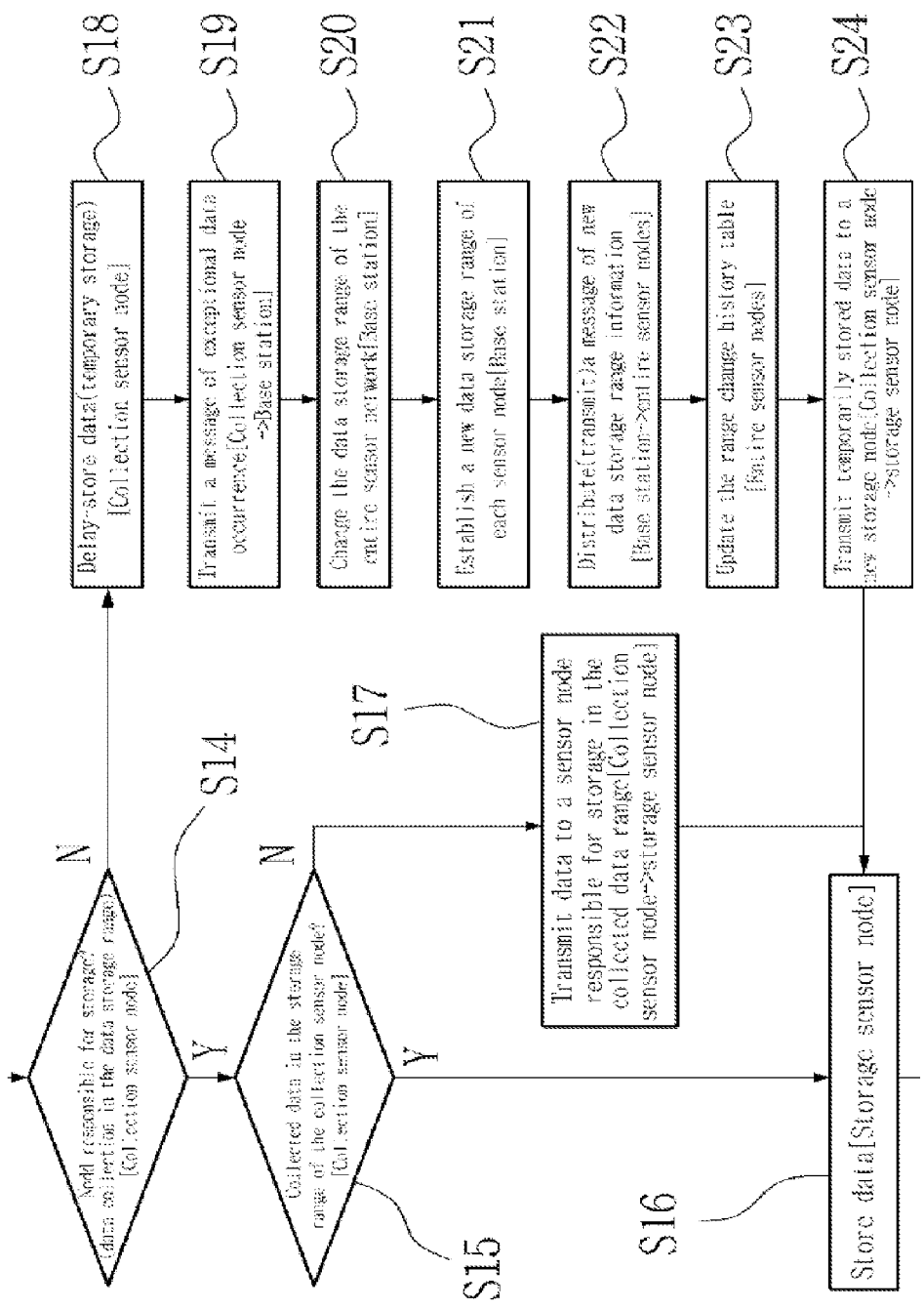

With reference to FIG. 9, the flow chart of the afore-mentioned method of context aware data-centric storage for wireless sensor networks of the present invention, described above in detail, will now be described.

As shown in FIG. 9, the base station establishes a data storage range of the entire sensor network in S10. In this case, the data storage range has a maximum value and a minimum value, where the maximum value is a maximum value of the data to be collected and the minimum value is a minimum value of the data to be collected.

The base station then divides the areas of the entire sensor network in S11. In this case, the data storage range of each sensor node depending on the area division is established.

Subsequently, the base station distributes (transmits) the message regarding data storage range information to the entire sensor nodes in S12.

The entire sensor nodes collect data in S13.

Subsequently, the collection sensor node determines whether there is a node responsible for storing collected data in the data storage range in S14.

Where there is a node responsible for storage as a result of determination by the collection sensor node, the collection sensor node determines whether the collected data is included in the storage range thereof in S15.

Where determining if the collected data is included in the storage range of the collection sensor node, the collected data are stored in the storage sensor node in S16.

On the contrary, where determining if the collected data is not included in the storage range of the collection sensor node, the collection sensor node transmits the collected data to the storage sensor node; that is, the sensor node is responsible for storing the collected data range in S17. The process of storing data in a storage sensor node is then carried out as described above.

In the above, the data is temporarily delayed and stored where there is no node responsible for storage as a result of determination of the collection sensor node in S18.

The collection sensor node then transmits a message regarding exceptional data occurrence to the base station in S19.

The base station then changes the data storage range of the entire sensor network in S20.

The base station establishes a new data storage range of each sensor node in S21.

The base station then distributes (transmits) a message regarding new data storage range information to the entire sensor nodes in S22.

The entire nodes then update the range change history table in S23.

The collection sensor node transmits the temporarily stored data to a new storage node in S24 to store the data in the storage sensor node. As described above, the transmitted data are stored in the storage sensor node.

It is determined whether data storage has not been carried out for a period of time longer than a specified time in each sensor node, after storage of data in the storage sensor node as described above, in S25.

The process returns to the step of collecting data which is S13 where data storage has not been carried out for a period of time longer than a specified time as a result of determination.

Where it is determined that data storage has not been carried out for a period of time longer than a specified time, each sensor node transmits a message regarding invalid range occurrence to the base station in S26.

The base station then determines whether the scale of the invalid range is not smaller than Γ in S27.

The process returns to the step of collecting data which is S13, where the invalid range is determined not greater than Γ.

The base station changes the data storage range of the entire sensor network where the invalid range is determined not smaller than Γ in S28.

The base station then establishes a new data storage range of each sensor node in S29.

The base station then determines (transmits) a message regarding new data storage range information to the entire sensor nodes in S30.

The entire sensor nodes then update the range change history table in S31.

The entire sensor nodes then return to the operation of collecting data to sequentially carry out the afore-mentioned sequence of operations.

The afore-mentioned embodiment of the present invention is not only implemented through a device and/or a method, but may also be implemented through programs, and a recording medium for implementing the functions corresponding to the configuration of the embodiments of the present invention. Such implementation will be apparent to those skilled in the art from the afore-mentioned disclosure of the embodiments.

The technical spirit of the present invention has been described in detail according to the preferred embodiments, but the afore-mentioned embodiments are intended to describe the present invention, and not to restrict the invention. Those skilled in the art will also understand that various embodiments can be made within the scope of the technical spirit of the present invention. Therefore, the scope of the present invention shall be specified by the following claims, not by the described exemplary embodiments.

DESCRIPTION OF SYMBOLS

51: Base station

What is claimed is:

1. A method of context aware data-centric storage for wireless sensor networks, comprising:
   collecting data from entire sensor nodes, after establishing a data storage range for an entire sensor network at a base station, dividing areas, and transmitting a message regarding data storage range information to entire sensor nodes;
   storing the collected data in a storage sensor node by determining whether there is a node responsible for storing the collected data to carry out an operation;
   determining whether the data storage has not been carried out for a period of time longer than a specified time in each sensor node after storing the data to decide whether to return to the step of collecting data or transmit a message regarding invalid range occurrence to the base station; and
   determining whether the scale regarding invalid range is not smaller than Γ to carry out an operation to decide whether to return to the step of collecting data.

2. The method of claim 1, wherein the data storage range for the entire sensor network is determined by means of a maximum value of data to be collected and a minimum value of data to be collected.

3. The method of claim 1, comprising determining whether the collected data is included in the storage range of the collection node, when it is determined that there is a node responsible for storage,
   storing the data in the storage sensor node, when it is determined that the collected data is included in the storage range of the collection sensor node, and
   transmitting the data to a sensor node responsible for storing the collected data range in the storage sensor node when it is determined that the collected data is not included, to store the data.

4. The method of claim 1, comprising storing data in the storage sensor node, after a sequential operation of temporarily delay-storing the data, when it is determined that there is not the node responsible for storage,
   transmitting a message regarding exceptional data occurrence,
   changing the data storage range of the entire sensor network,
   establishing a new data storage range of each sensor node,
   distributing a message regarding new data storage range information,
   updating a range change history table, and
   transmitting the temporarily delay-stored data to a new storage node.

5. The method of claim 1, comprising returning to the step of collecting data from the entire sensor nodes, when it is determined that the scale of the invalid range is smaller than Γ.

6. The method of claim 1, comprising returning to the step of collecting data in the entire sensor nodes, after a sequential operation of changing the data storage range of the entire sensor network, when it is determined that the scale of the invalid range is not smaller than Γ,
   establishing a new data storage range of each sensor node,
   distributing a message regarding the new data storage range information, and
   updating a range change history table.

7. A method of context aware data-centric storage for wireless sensor networks, comprising:
   establishing a data storage range of an entire sensor network at a base station, dividing areas, and transmitting a message regarding data storage range information to entire sensor nodes;
   collecting data in the entire sensor nodes;
   determining whether there is a node responsible for storage of the collected data in the data storage range in a collection sensor node;
   determining whether the collected data are included in the storage range of the collection sensor node by the collection sensor node, when it is determined that there is a node responsible for storage;
   storing the data in the storage sensor node, when it is determined that the collected data is included in the storage range of the collection sensor node, and storing the data in the storage sensor node, after transmission the data from the collection sensor node to the sensor node responsible for storing collected data range, when it is determined that the collected data is not included in the storage range of the collection sensor node;
   storing the data in the storage sensor node, after a sequential operation of temporarily delay-storing the data in the collection sensor node when it is determined that there is no node responsible for storage,
   transmitting a message of exceptional data occurrence to the base station, changing the data storage range of the entire sensor network in the base station, establishing a new data storage range of each sensor node, distributing a message regarding new data storage range information to the entire sensor nodes, updating a range change history table, and transmitting the temporarily delay-stored data in the storage sensor node of the collection sensor node to a new storage node;

determining whether data storage has not been carried out in each sensor node for a period of time longer than a specified time, after storing the data in the storage sensor node, returning to the step of collecting data when it is determined that data storage has not been carried out, and transmitting a message regarding invalid range occurrence from each sensor node to the base station when it is determined that data storage has not been carried out; and returning to the step of collecting data in the entire sensor nodes when it is determined that the scale of the invalid range is smaller than $\Gamma$ in the base station, returning to the step of collecting data in the entire sensor nodes, after a sequential operation of changing the data storage range of the entire sensor network when it is determined that the scale of the invalid range is not smaller than $\Gamma$, establishing a new data storage range of each sensor node, distributing a message of new data storage range information to the entire sensor nodes, and updating a range change history table.

\* \* \* \* \*